(12) United States Patent
Zhang

(10) Patent No.: US 9,939,562 B2
(45) Date of Patent: Apr. 10, 2018

(54) DIFFUSER PLATE, BACKLIGHT UNIT AND DISPLAY DEVICE

(71) Applicants: BOE Technology Group Co., Ltd., Beijing (CN); Beijing BOE Display Technology Co., Ltd., Beijing (CN)

(72) Inventor: Minghui Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 224 days.

(21) Appl. No.: 13/996,083

(22) PCT Filed: Nov. 30, 2012

(86) PCT No.: PCT/CN2012/085686
§ 371 (c)(1),
(2) Date: Jun. 20, 2013

(87) PCT Pub. No.: WO2014/012318
PCT Pub. Date: Jan. 23, 2014

(65) Prior Publication Data
US 2014/0055985 A1 Feb. 27, 2014

(30) Foreign Application Priority Data
Jul. 19, 2012 (CN) .......................... 2012 1 0251660

(51) Int. Cl.
*G02B 5/02* (2006.01)
*G02F 1/1335* (2006.01)
(Continued)

(52) U.S. Cl.
CPC ............ *G02B 5/0226* (2013.01); *F21V 11/00* (2013.01); *G02B 5/0278* (2013.01);
(Continued)

(58) Field of Classification Search
CPC ........ G02B 5/02; G02B 5/0205; G02B 5/021; G02B 5/0215; G02B 5/0226;
(Continued)

(56) References Cited

U.S. PATENT DOCUMENTS 6,709,143 B2 * 3/2004 Harada ..................... F21V 3/04
359/599
7,072,115 B2 * 7/2006 Uekita ................. G02B 5/0226
349/112

(Continued)

FOREIGN PATENT DOCUMENTS

CN       1963566 A     5/2007
CN       101021579 A   8/2007
(Continued)

OTHER PUBLICATIONS

English Machine Translation of CN 102183804.*
English machine translation of CN 102183804 A.*
Human translation of CN 102183804 A.*
First Office Action issued by State Intellectual Property Office of the People's Republic of China dated Nov. 1, 2013, 7pgs.
(Continued)

*Primary Examiner* — Joseph P Martinez
*Assistant Examiner* — Nicholas R Pasko
(74) *Attorney, Agent, or Firm* — Ladas & Parry LLP

(57) ABSTRACT

A diffuser plate, comprising: a substrate (4), wherein an upper surface of the substrate (4) comprises at least a first concave surface (42), a lower surface of the substrate (4) comprises at least a second concave surface (41); a first base layer (5) disposed on the upper surface of the substrate (4); a first scattering particle film layer (6) disposed on an upper surface of the first base layer (5); a second base layer (3) disposed on the lower surface of the substrate (4); and a second scattering particle film layer (2) disposed on a lower surface of the second base layer (3).

8 Claims, 2 Drawing Sheets

(51) Int. Cl.
*F21V 11/00* (2015.01)
*F21V 8/00* (2006.01)

(52) U.S. Cl.
CPC .. *G02F 1/133606* (2013.01); *G02F 1/133611* (2013.01); *G02B 5/0236* (2013.01); *G02B 6/0025* (2013.01); *G02F 2001/133607* (2013.01)

(58) Field of Classification Search
CPC .. G02B 5/0231; G02B 5/0236; G02B 5/0242; G02B 5/0268; G02B 5/0273; G02B 5/0278; G02B 5/0284; G02B 5/0289; G02B 5/0294
USPC ............ 359/361, 452, 599; 349/64; 362/355
See application file for complete search history.

(56) References Cited

U.S. PATENT DOCUMENTS

| | | | | |
|---|---|---|---|---|
| 7,349,039 B2* | 3/2008 | Lee | ...... | G02B 6/0053 349/57 |
| 7,391,571 B2* | 6/2008 | Lee | ...... | G02B 5/0221 359/599 |
| 7,513,655 B2* | 4/2009 | Chang | ...... | G02B 5/0231 362/332 |
| 7,513,673 B2* | 4/2009 | Chang | ...... | G02B 5/0215 362/246 |
| 7,585,094 B2* | 9/2009 | Chang | ...... | G02F 1/133606 362/332 |
| 7,611,262 B2* | 11/2009 | Chang | ...... | G02B 5/0215 362/246 |
| 7,806,545 B2* | 10/2010 | Hsu | ...... | G02B 5/0231 349/64 |
| 8,110,276 B2* | 2/2012 | Yoshida | ...... | G02B 5/0226 428/134 |
| 2007/0134438 A1 | 6/2007 | Fabick et al. | | |
| 2008/0037274 A1* | 2/2008 | Chang | ...... | G02B 5/0231 362/608 |
| 2009/0073676 A1* | 3/2009 | Hsu | ...... | G02B 5/045 362/97.1 |
| 2009/0161221 A1* | 6/2009 | Yang | ...... | G02B 5/0242 359/599 |
| 2009/0167985 A1* | 7/2009 | Ha | ...... | G02B 3/0006 349/64 |
| 2009/0279175 A1 | 11/2009 | Laney et al. | | |
| 2010/0008062 A1* | 1/2010 | Chang | ...... | G02B 5/02 362/97.1 |
| 2011/0050558 A1 | 3/2011 | Park et al. | | |
| 2011/0096402 A1* | 4/2011 | Sun | ...... | G02B 1/04 359/599 |
| 2011/0170184 A1 | 7/2011 | Wolk | | |
| 2013/0100657 A1* | 4/2013 | Louh | ...... | G02B 3/0043 362/225 |
| 2014/0055985 A1 | 2/2014 | Zhang | | |

FOREIGN PATENT DOCUMENTS

| | | | |
|---|---|---|---|
| CN | 101122703 A | | 2/2008 |
| CN | 101625482 A | | 1/2010 |
| CN | 102183804 A | * | 9/2011 |
| CN | 102436019 A | | 5/2012 |
| CN | 102798908 A | | 11/2012 |
| JP | 2007-148415 | | 6/2007 |
| WO | WO 2009072429 A1 | * | 6/2009 ....... G02F 1/133603 |

OTHER PUBLICATIONS

English translation of First Office Action issued by State Intellectual Property Office of the People's Republic of China dated Nov. 1, 2013, 5pgs.
International Search Report for International Application No. PCT/CN2012/085686 dated May 2, 2013, 14pgs.
International Preliminary Report on Patentability for International Application No. PCT/CN2012/081159 dated Mar. 12, 2014, nine (9) pages.
First Office Action for Chinese Patent Application No. 2011102166038.X dated May 5, 2014; five (5) pages.
English translation of First Office Action for Chinese Patent Application No. 2011102166038.X dated May 5, 2014; two (2) pages.
International Preliminary Report on Patentability for International Application No. PCT/CN2012/085479 dated Feb. 3, 2015, six (6) pages.
Office Action for U.S. Appl. No. 13/703,668 dated Jul. 10, 2014; six (6) pages.
Office Action for U.S. Appl. No. 13/703,668 dated Sep. 2, 2014; eleven (11) pages.
International Preliminary Report on Patentability for International Application No. PCT/CN2012/085686, Eight (8) pages.
English abstract of CN102183804; One (1) page.
English abstract of CN101021579; Two (2) pages.
Extended European Search Report Appln. No. 12868329.9-1562 / 2876469 PCT/CN2012085686; dated Feb. 15, 2016.
EPO Communication dated Aug. 21, 2017: Appln. 12 868 329.9.

* cited by examiner

US 9,939,562 B2

DIFFUSER PLATE, BACKLIGHT UNIT AND DISPLAY DEVICE

CROSS REFERENCE TO RELATED APPLICATIONS

This application is based on International Application No. PCT/CN2012/085686 filed on Nov. 30, 2012, which claims priority to Chinese National Application No. 201210251660.8, filed on Jul. 19, 2012, the contents of which are incorporated herein by reference.

FIELD OF THE ART

The present invention relates to a diffuser plate, a backlight unit and a display device.

BACKGROUND

In flat-panel display (FPD) technology, the display effect of the whole display device is related to a great extent to the uniformity of the light emitted by the backlight unit. Direct-lit type backlight unit is widely used in display devices and the diffuser plate is a key component of the entire direct-lit type backlight unit.

FIG. 1 schematically illustrates a configuration of a diffuser plated as included in a conventional backlight unit.

The diffuser plate included in the conventional direct-lit type backlight unit generally comprises a plate-shaped substrate 02. A diffuser film 01 is disposed on a side of the substrate 02 that faces a light source of the backlight unit (i.e., light incident side of the diffuser plate) and a scattering particle film layer 03 is disposed on the opposite side (i.e., light emission side of the diffuser plate).

The light emitted by the light source is scattered by the diffuser film 01 and the scattering particle film layer 03. Conventionally, the diffuser plate of the direct-lit type backlight unit scatters the light beam from the light source homogenously without distinguishing positions of a luminophor and a non-luminophor. However, in the direct-lit type backlight unit, the luminophors in the light source are arranged with a certain space between each other and the positions having the luminophors have a higher brightness than the other positions. As a result, the light can not be scattered sufficiently enough when passing through the diffuser plate 01 and the scattering particle film layer 03, which will cause the phenomenon of luminophor-located positions having higher brightness than the other positions. Such a phenomenon can further produce an uneven brightness and Lamp Mura and negatively affect the display quality of the products.

SUMMARY

The invention provides a diffuser plate for a backlight unit that can improve the uniformity of the light scattered by the backlight unit. The invention further provides a backlight unit including the above diffuser plate and a display device comparing the above backlight unit. The backlight unit may be of direct-lit type or edge-lit type.

An aspect of the invention provides a diffuser plate comprising: a substrate, wherein an upper surface of the substrate comprises at least a first concave surface, a lower surface of the substrate comprises at least a second concave surface; a first base layer disposed on the upper surface of the substrate; a first scattering particle film layer disposed on an upper surface of the first base layer; a second base layer disposed on the lower surface of the substrate; and a second scattering particle film layer disposed on a lower surface of the second base layer.

As an example, a plurality of the first and the second concave surfaces are provided, the first concave surfaces of the upper surface of the substrate are spaced apart from each other from each other and the second concave surfaces of the lower surface of the substrate are spaced apart from each other.

As an example, the first and second concave surfaces are disposed in a one-to-one correspondence.

As an example, a light diffusing agent is disposed in the substrate.

As an example, a refractive index of the substrate is larger than refractive indices of the first and/or second base layer.

As an example, the refractive index of the substrate is 1.59~1.60, the refractive index of the first base layer is 1.48~1.55 and that of the second base layer is 1.48~1.55.

As an example, the refractive index of the first base layer is the same as that of the second base layer.

As an example, a material of the substrate is transparent polystyrene or transparent Polycarbonate.

As an example, both the first and the second base layers are made of polymethylmethacrylate.

Another aspect of the invention provides a backlight unit comprising the diffuser plate as described above.

As an example, the backlight unit further comprises a light source comprising at least a luminophor, wherein the light source is disposed below the diffuser plate.

As an example, the second scattering particle film layer of the diffuser plate faces the light source and the second concave surface of the diffuser plate is disposed in a one-to-one correspondence with the luminophor of the light source.

Another aspect of the invention provides a display device comprising the backlight unit as described above.

BRIEF DESCRIPTION OF THE DRAWINGS

In order to clearly illustrate the technical solution of the embodiments of the invention, the drawings of the embodiments will be briefly described in the following; it is obvious that the described drawings are only related to some embodiments of the invention and thus are not limitative of the invention.

DESCRIPTION OF THE REFERENCE NUMERALS

Figure 1:
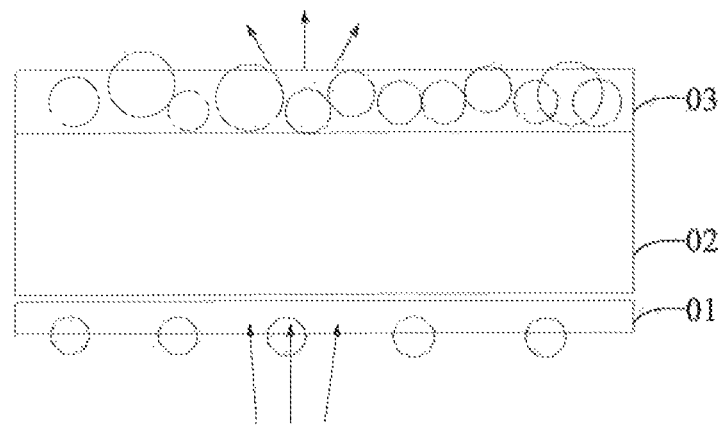
FIG. 1 schematically illustrates a configuration of a diffuser plate included in a conventional backlight unit.

01: diffuser film; 02, 4: substrate; 03: scattering particle film layer; 1: luminophor; 2: second scattering particle film layer; 3: second base layer; 41: second concave surface; 42: first concave surface; 5: first base layer; 6: first scattering particle film layer.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

It is noted that the terms 'upper surface', 'lower surface', 'upwards', and 'downwards' are for the purpose of clearly explaining the configuration of the diffuser plate and should not be considered as limitative.

A first technical solution of the invention provides a diffuser plate for a direct-lit type backlight unit comprising: a substrate, an upper surface of the substrate is concaved downwards to form at least a first concave surface, a first base layer is attached to the upper surface of the substrate, and a first scattering particle film layer is attached to an upper surface of the first base layer; a lower surface of the substrate is concaved upwards to form at least a second concave surface, a second base layer is attached to the lower surface of the substrate and a second scattering particle film layer is attached to a lower surface of the second base layer.

The term "attach" does not mean affixing the film layers together via adhesive tapes and the like. The term is merely used to illustrate that the individual film layers are in contact with each other. As an example, the upper surface of the substrate is concaved downwards to form at least the first concave surface and a first base layer is attached to the upper surface of the substrate, which means that the first base layer has a convex portion at a position corresponding to the concave surface so as to contact the first concave surface.

For the convenience of describing the above diffuser plate, the lower surface of the diffuser plate is designated as the light incident side. Based on that, when the light from the light source is diffused by the diffuser plate, the light successively goes through the second scattering particle film layer, the second base layer, the substrate, the first base layer and the first scattering particle film layer, where all of the second scattering particle film layer, the concave surface of the lower surface of the substrate, the first concave surface of the upper surface of the substrate and the first scattering particle film layer diffuse the light from the light source. As a result, in comparison with the conventional diffuser plate, the diffuser plate provided by the invention further diffuses the light from the light source through the first and second concave surfaces of the substrate, in addition to the first and second scattering particle film layers, which improves the uniformity of the light from the light source scattered by the diffuser plate.

Therefore, the diffuser plate provided by the invention may improve the uniformity of the scattered light of the direct-lit type backlight unit.

According to a second solution of the invention based on the first solution, a plurality of first and second concave surfaces are provided to further improve the uniformity of the light diffusion through the first and second concave surfaces. The first concave surfaces of the upper surface of the substrate are spaced apart from each other and the second concave surfaces of the lower surface of the substrate are spaced apart from each other, while the first and second concave surfaces are disposed in a one-to-one correspondence. The first and second concave surfaces being disposed in one-to-one correspondence makes each pair of the first and concave surfaces opposed to each other, which forms a concave lens on the substrate and thereby improves the diffusing performance of the first and second concaves surfaces.

The term "spaced apart" is used in the present invention to illustrate that the first concave surfaces are disposed on the upper surface of the substrate with a part of the upper surface of the substrate in between. The same holds for the second concave surfaces.

In a third solution of the invention based on the first or the second solution, a light diffusing agent may be disposed in the substrate to improve the scattering performance of the concave lens structure of the substrate.

In a fourth solution of the invention based on the first or the second solution, the refractive index of the substrate may be, for example, larger than the refractive indices of the first and second base layers, so as to improve the diffusing performance of the first and second concave surfaces through which the light passes.

A fifth solution of the invention makes further limitation to the fourth solution and further defines the range of the refractive indices of the substrate and the first and second base layers. The refractive index of the substrate is, for example, 1.59~1.60, the refractive index of the first base layer is 1.4~1.55 and that of the second base layer 1.48~1.55.

A sixth solution of the invention based on the fifth solution provides a diffuser plate in which the refractive index of the first base layer is the same as that of the second base layer.

A seventh solution of the invention based on the sixth solution provides a diffuser plate in which a material of the substrate is typically transparent polystyrene or transparent polycarbonate. The substrate may be made of other transparent materials, such as glass, that ensures light transmittance of the substrate.

For the easy fabrication of the first and the second base layers, a eighth solution of the invention based on the sixth solution provides a diffuser plate in which both the first and the second base layer are made of polymethylmethacrylate (PMMA) with a refractive index of 1.49.

A ninth solution of the invention provides a direct-lit type backlight unit comprising: a light source comprising at least a luminophor and a diffuser plate in accordance with any of the first to the eighth solution of the invention, where the light source is disposed below the diffuser plate, the second scattering particle film layer of the diffuser plate faces the light source, and the second concave surface of the diffuser plate is disposed in a one-to-one correspondence with the luminophor of the light source.

By disposing the second concave surfaces in one-to-one correspondence with the luminophors in the light source, each of the second concave surfaces diffuses light from the corresponding luminophor, thereby improving the uniformity of the diffusion.

A tenth solution of the invention provides a display device comprising a direct-lit type backlight unit of the ninth embodiment of the invention.

The above describes various solutions of the invention, which may be combined with each other in part or whole to form embodiments of the invention. In the detailed embodiments, other solutions may replace solutions as described above. Some detailed embodiments of the invention will be described such that those skilled in the art may clearly understand the solutions of the invention.

Figure 2:
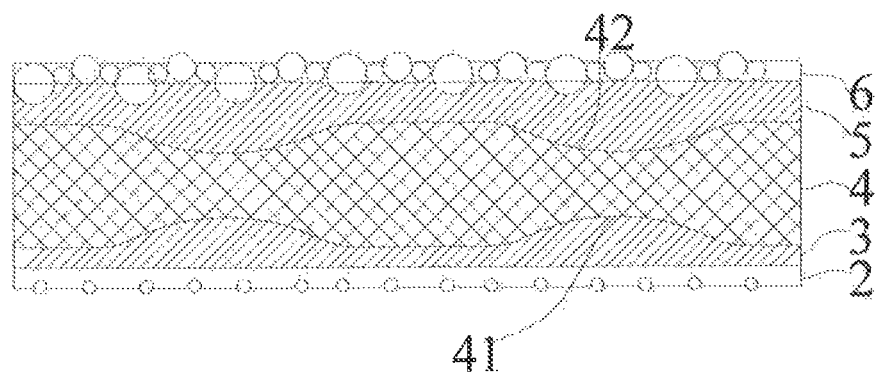
FIG. 2 schematically illustrates a configuration of a diffuser plate in accordance with the present invention.

As illustrated in FIG. 2, a diffuser plate for use in the direct-lit type backlight unit provided by the invention comprises a substrate 4, an upper surface of the substrate 4 is concaved downwards to form at least a first concave surface 42, a first base layer 5 is attached to the upper surface of the substrate 4, and a first scattering particle film layer 6 is attached to an upper surface of the first base layer 5; a lower surface of the substrate 4 is concaved upwards to form at least a second concave surface 41, a second base layer 3 is attached to the lower surface of the substrate 4 and a second first scattering particle film layer 2 is attached to a lower surface of the second base layer 3.

Figure 3:
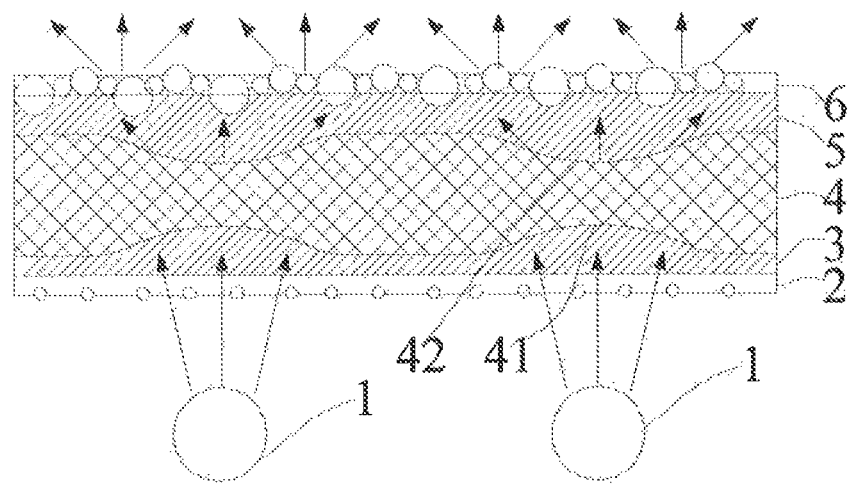
FIG. 3 schematically illustrates a scattering principle of a diffuser plate in accordance with the present invention.
Figure 4:
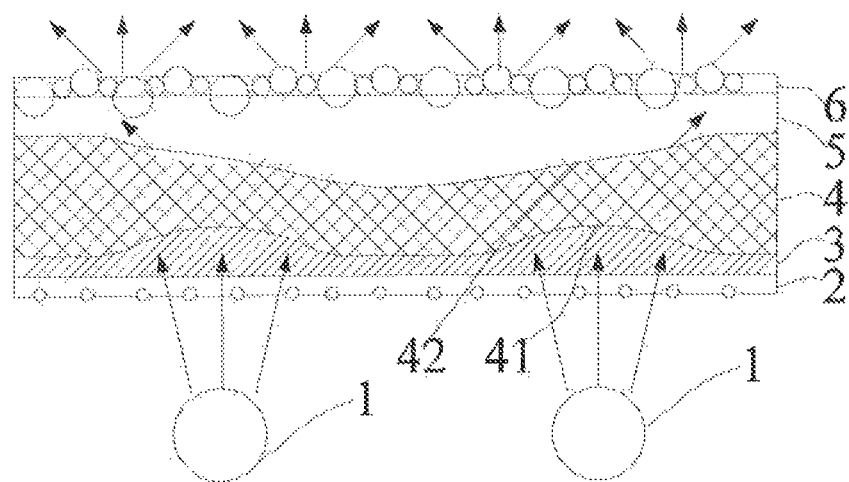
FIG. 4 schematically illustrates a scattering principle of a diffuser plate in accordance with an alternate embodiment of the present invention.

As illustrated in FIG. 3, for the convenience of describing the above diffuser plate, the lower surface of the diffuser plate is designated as the light incident side. Based on that, when the light from the light source is diffused by the diffuser plate, the light successively goes through the second scattering particle film layer 2, the second base layer 3, the substrate 4, the first base layer 5 and the first scattering particle film layer 6, where all of the second scattering particle film layer 2, the second concave surface 41 of the lower surface of the substrate 4, the first concave surface 42 of the upper surface of the substrate 4 and the first scattering particle film layer 6 diffuse the light from the light source. As a result, in comparison with the conventional diffuser plate, the diffuser plate provided by the invention further diffuses the light from the light source through the first and second concave surfaces 41 and 42 of the substrate 4, in addition to the first and second scattering particle film layers 6 and 2, which improves the uniformity of the light from the light source after scattered by the diffuser plate.

Therefore, the diffuser plate provided by the invention may improve the uniformity of the scattered light of the direct-lit type backlight unit.

Moreover, it can be easily understand that the diffuser plate of the invention may also be used in edge-lit type backlight unit.

According to an exemplary embodiment, the first and second concave surfaces 42 and 41 as described above may have a plurality of correspondence relationship.

According to a first correspondence relationship and as illustrate its' 4, one first concave surface 42 and a plurality of second concave surfaces 41 are provided. The one first concave surface 42 is opposed to all the luminophors 1 of the light source, while each of second concave surfaces 41 is opposed to respective luminophors 1 (i.e. the second concave surfaces 41 and the luminophors are disposed in a one-to-one correspondence) of the light source.

For the purpose of diffusing the light from the luminophors 1 of the light source more efficiently, according to a second correspondence relationship, for example, a plurality of first and second concave surfaces 42 and 41 are provided, the first concave surfaces 42 of the upper surface of the substrate 4 are spaced apart from each other, the second concave surfaces 41 of the lower surface of the substrate 4 are spaced apart from each other, while the first and second concave surfaces 42 and 41 are disposed in a one-to-one correspondence. The first and second concave surfaces 42 and 41 being disposed in one-to-one correspondence makes each pair of the first and concave surfaces 42 and 41 opposed to each other, which forms a concave lens on the substrate 4 and thereby improves the diffusing performance of the first and second concaves surfaces.

Furthermore, according to an exemplary embodiment, the refractive index of the substrate 4 may be larger than the refractive indices of the first and second base layers 5 and 3, so as to improve the diffusing performance of the first and second concave surfaces through which light passes.

Specifically, in selecting a material suitable for the production requirement, the refractive index of the substrate 4 is, for example, 1.59~1.60, the refractive index of the first base layer 5 is 1.48~1.55 and that of the second base layer 3 is also 1.48~1.55. Many transparent materials have the refractive index in the ranges of 1.59~1.60 and 1.48~1.55, making such materials appropriate for the production.

For the purpose of improving the uniformity of the light scattered by the scattering structure formed by the concave lens structure of the substrate 4 and the first and second base layers 5 and 3, the refractive index of the first base layer 5 is the same as that of the second base layer 3. For example, the material of the first base layer 5 is the same as that of the second base layer 3.

Specifically, the material of the substrate 4 is typically transparent polystyrene (PS) with a refractive index of 1.59~1.60. Light diffusing agent may be added to the PS material to improve the scattering performance of the concave lens structure of the substrate 4.

The material of the substrate 4 may also be transparent polycarbonate (PC) with a refractive index of 1.59~1.60. Light diffusing agent may also be added to the PC material to improve the scattering performance of the concave lens structure of the substrate 4.

The substrate 4 may also be made of other transparent materials, such as glass, that ensures light transmittance of the substrate.

For example, the first and the second base layer 3 and 5 are made of polymethylmethacrylate (PMMA), which has a refractive index of about 1.49 and is highly transparent, low mass, easily molded, stable in size, difficult to deform, and has good light guidance and good optical rotation performance.

The invention further provides a backlight unit comprising the above diffuser plate.

For example, the backlight unit may be a direct-lit type backlight unit and comprises: a light source comprising at least a luminophor 1 and a diffuser plate in accordance with any of the embodiments or solutions of the invention, where the light source is disposed below the diffuser plate, a second scattering particle film layer 2 of the diffuser plate faces the light source, and second concave surfaces 41 of the diffuser plate being disposed in a one-to-one correspondence with the luminophors 1 of the light source.

By disposing the second concave surfaces 41 in one-to-one correspondence with the luminophors 1 in the light source, each of the second concave surfaces 41 diffuses light from the corresponding luminophor 1, thereby improves the uniformity of the diffusion.

According to an exemplary embodiment, a plurality of first and second concave surfaces 42 and 41 are provided, the first concave surfaces 42 of the upper surface of the substrate 4 are spaced apart from each other, the second concave surfaces 41 of the lower surface of the substrate 4 are spaced apart from each other, while the first and second concave surfaces 42 and 41 are disposed in a one-to-one correspondence. The first and second concave surfaces 42 and 41 being disposed in one-to-one correspondence makes each pair of the first and concave surfaces 42 and 41 opposed to each other, which forms a concave lens on the substrate 4 and thereby improves the diffusing performance of the first and second concaves surfaces. Correspondingly, there may be a plurality of luminophors 1 in the light source, and each of the concave lens structure in the substrate is disposed in one-to-one correspondence with the respective luminophor in the light source, thereby further improving the uniformity of the light from the light source scattered by the diffuser plate.

The backlight unit may also be an edge-lit type backlight unit, for example.

An embodiment of the invention further provides a display device comprising the above backlight unit. The display device has good display performance. The principle of the display device will not be explained in detail.

What are described above is related to the illustrative embodiments of the disclosure only and not limitative to the scope of the disclosure; the scopes of the disclosure are defined by the accompanying claims.

What is claimed is:

1. A diffuser plate, comprising:
a substrate, wherein the substrate comprises an upper surface that comprises only one first concave portion, and a lower surface that comprises a plurality of second concave portions, wherein the first concave portion and the second concave portions diffuse light from a light source, and the one first concave portion is opposed to all the second concave portions;
a first base layer disposed on the upper surface of the substrate;
a first scattering particle film layer disposed on an upper surface of the first base layer;
a second base layer disposed on the lower surface of the substrate; and
a second scattering particle film layer disposed on a lower surface of the second base layer,
wherein the light from the light source successively goes through the second scattering particle film layer, the second base layer, the substrate, the first base layer, and the first scattering particle film layer, and the substrate further comprises a light diffusing agent that scatters light in the substrate.

2. The diffuser plate of claim 1, wherein the refractive index of the first base layer is the same as that of the second base layer.

3. The diffuser plate of claim 1, wherein a material of the substrate is transparent polystyrene or transparent polycarbonate.

4. The diffuser plate of claim 1, wherein both the first and the second base layers are made of polymethylmethacrylate with a refractive index of 1.49.

5. The diffuser plate of claim 1, wherein a refractive index of the substrate is larger than refractive indices of the first and/or second base layer.

6. The diffuser plate of claim 5, wherein the refractive index of the substrate is 1.59~1.60, the refractive index of the first base layer is 1.48~1.55, and the refractive index of the second base layer is 1.48~1.55.

7. A direct-lit type backlight unit comprising the light source and the diffuser plate of claim 1, wherein the light source comprises a plurality of light emitters disposed below the diffuser plate, the second scattering particle film layer of the diffuser plate faces the light source, each second concave portion of the diffuser plate is opposed to a respective light emitter in the plurality of light emitters, and the one first concave portion are opposed to all the light emitters of the light source.

8. A display device comprising the direct-lit type backlight unit of claim 7.

* * * * *